United States Patent
Van Oost et al.

(10) Patent No.: US 10,075,859 B2
(45) Date of Patent: Sep. 11, 2018

(54) METHOD FOR MONITORING A WIRELESS LINK OF A WI-FI NODE OF A CUSTOMER PREMISES EQUIPMENT DEVICE, AND CUSTOMER PREMISES EQUIPMENT DEVICE UTILIZING THE METHOD

(71) Applicant: THOMSON LICENSING, Issy de Moulineaux (FR)

(72) Inventors: Koen Van Oost, Borsbeek (BE); Frederik Verwaest, Mol (BE)

(73) Assignee: Thomson Licensing, Issy-les-Moulineaux (FR)

( * ) Notice: Subject to any disclaimer, the term of this patent is extended or adjusted under 35 U.S.C. 154(b) by 3 days.

(21) Appl. No.: 14/412,463

(22) PCT Filed: Jun. 20, 2013

(86) PCT No.: PCT/EP2013/062888
§ 371 (c)(1),
(2) Date: Jan. 2, 2015

(87) PCT Pub. No.: WO2014/005852
PCT Pub. Date: Jan. 9, 2014

(65) Prior Publication Data
US 2015/0195727 A1    Jul. 9, 2015

(30) Foreign Application Priority Data
Jul. 2, 2012 (EP) ..................................... 12305790

(51) Int. Cl.
*H04W 24/08* (2009.01)
*H04L 12/26* (2006.01)
*H04W 84/12* (2009.01)

(52) U.S. Cl.
CPC ........... *H04W 24/08* (2013.01); *H04L 43/026* (2013.01); *H04L 43/106* (2013.01); *H04L 43/12* (2013.01); *H04W 84/12* (2013.01)

(58) Field of Classification Search
CPC ... H04L 12/66; H04L 43/087; H04L 12/2602; H04L 43/0829; H04L 43/0852;
(Continued)

(56) References Cited

U.S. PATENT DOCUMENTS 7,573,859 B2 * 8/2009 Taylor ................ H04L 12/1868
370/252
8,102,866 B2   1/2012 Poza Jimenez et al.
(Continued)

FOREIGN PATENT DOCUMENTS

| CN | 101616420 | 5/2011 |
| CN | 102082706 | 6/2011 |

(Continued)

OTHER PUBLICATIONS

Search Report Dated Aug. 23, 2013.
(Continued)

*Primary Examiner* — Jung Liu
(74) *Attorney, Agent, or Firm* — Myers Wolin LLC

(57) ABSTRACT

The method for monitoring a wireless link of a Wi-Fi node of a customer premises equipment device comprises the steps of replicating receive packets as well as transmit packets passing through the transmit/receive buffers of a physical layer by including a time stamp for the replicated packets, and passing the replicated packets to a monitoring unit. All packets are replicated in particular by including an Rx/Tx control of the Wi-Fi software driver of the customer premises equipment device to obtain the exact packet exchange and timing of the Wi-Fi network. The customer premises equipment device comprises a Wi-Fi node includ- (Continued)

ing a Wi-Fi software driver and a physical layer with transmit/receive buffers, a Wi-Fi monitoring application for replicating the packets passing through the transmit/receive buffers, and a monitoring data path for passing the replicated packets to a monitoring unit.

11 Claims, 2 Drawing Sheets

(58) Field of Classification Search
CPC ... H04L 41/509; H04L 41/5087; H04L 43/00; H04L 69/22; H04L 63/0227; H04L 43/067; H04L 63/1425; H04L 63/0823; H04L 43/06; H04L 43/0811
See application file for complete search history.

(56) References Cited

U.S. PATENT DOCUMENTS

| | | | | |
|---|---|---|---|---|
| 2007/0008984 A1* | 1/2007 | Philips | G06F 5/14 | 370/412 |
| 2007/0086397 A1* | 4/2007 | Taylor | H04L 12/1868 | 370/338 |
| 2007/0110018 A1* | 5/2007 | Delaney | H04W 24/00 | 370/338 |
| 2007/0160046 A1* | 7/2007 | Matta | H04L 12/1868 | 370/390 |
| 2010/0188981 A1* | 7/2010 | Poza Jimenez | H04L 12/2602 | 370/241 |
| 2012/0314573 A1* | 12/2012 | Edwards | H04L 12/66 | 370/230.1 |

FOREIGN PATENT DOCUMENTS

| | | |
|---|---|---|
| JP | H08289356 A | 11/1996 |
| JP | 2002290497 A | 10/2002 |
| JP | 2005094278 A2 | 4/2005 |
| JP | 200781938 A | 3/2007 |
| JP | 2010239418 A | 10/2010 |
| KR | 986987 | 10/2010 |

OTHER PUBLICATIONS

IEEE Std 802.1D-2004 (Revision of IEEE Std 802.1, 1998 Edition) incorporating IEEE Std 802.1-2001—IEEE Std 802.1w-2001, "IEEE Standard for Local and Metropolitan Area Networks: Media Access Control (MAC) Bridges", Jun. 9, 2004.

ISO/IEC 8802-11-IEEE Std 802.11—2nd edition Aug. 1, 2005, "Information technology—Telecommunications and information exchange between systems—Local and metropolitan area networks—Specific requirements, Part 11: Wireless LAN Medium Access Control (MAC) and Physical Layer (PHY) specifications".

IEEE Std 802.11b-1999 (Supplement to ANSI/IEEE Std 802.11— 1999 Edition)—"Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications: Higher-speed Physical Layer (PHY) extension in the 2.4 GHz band", Jan. 20, 2000.

IEEE Std 802.11b-1999/Cor 1-2001 (Corrigendum to IEEE Std 802.11b-1999), "IEEE Standard for Information technology—Telecommunications and information exchange between systems— Local and metropolitan area networks—Specific requirements— Part 11: Wireless LAN Medium Access Control (MAC) and Physical Layer (PHY) specifications: Amendment 2: Higher-speed Physical Layer (PHY) extension in the 2.4 GHz band"—Nov. 7, 2001.

ISO/IEC 8802-11, IEEE Std 802.11g—2003 (Amendment to IEEE Std 802.11-1999),Second edition Aug. 1, 2005, Amendment 4 Aug. 15, 2006,"Information technology—Telecommunications and information exchange between systems—Local and metropolitan area networks—Specific requirements, Part 11: Wireless LAN Medium Access Control (MAC) and Physical Layer (PHY) specifications— Amendment 4: Further Higher Data Rate extension in the 2.4 GHz Band".

IEEE Std 802.11n-2009 (Amendment to IEEE Std 802. Nov. 2007 as amended by IEEE Std 802.11k-2008, IEEE Std 802.11r-2008, IEEE Std 802.11y-2008 and IEEE Std 802.11w-2009), "IEEE Standard for Information technology-Telecommunications and information exchange between systems—Local and metropolitan area networks—Specific requirements—Part 11: Wireless LAN Medium Access Control (MAC)and Physical Layer (PHY) Specifications Amendment 5: Enhancements for Higher Throughput", Oct. 29, 2009.

Broadband Forum—Technical Report—TR-069 CPE WAN Management Protocol—Issue 1 Amendment 4—Jul. 2011, Protocol Version: 1.3.

Broadband Forum—Technical Report—TR-181—Device Data Model for TR-069—Issue 2 Amendment 2—Feb. 2011.

* cited by examiner

METHOD FOR MONITORING A WIRELESS LINK OF A WI-FI NODE OF A CUSTOMER PREMISES EQUIPMENT DEVICE, AND CUSTOMER PREMISES EQUIPMENT DEVICE UTILIZING THE METHOD

This application claims the benefit, under 35 U.S.C. § 365 of International Application PCT/EP2013/062888, filed Jun. 20, 2013, which was published in accordance with PCT Article 21(2) on Jan. 9, 2014 in English and which claims the benefit of European patent application No. 12305790.3, filed Jul. 2, 2012.

TECHNICAL FIELD

The invention relates to the field of customer-premises equipment devices including a Wi-Fi node coupled to an IP interface, e.g. via a digital subscriber line to a service provider.

BACKGROUND OF THE INVENTION

Residential gateways are widely used to connect devices in the home to the Internet or any other wide area network (WAN). Residential gateways use in particular digital subscriber line (DSL) technology that enables a high data rate transmission over copper lines or optical lines. During the years, several DSL standards have been established differing in data rates and in range, for example ADSL and VDSL, which are referred to in this context as xDSL. Also optical transmission for Internet services is well known, for example fiber-to-the-home (FTTH) and fiber-to-the premises (FTTP). Residential gateways, but also other devices such as routers, switches, telephones and set-top boxes, are understood in this context as customer premises equipment (CPE) devices.

Residential gateways including wireless technology have a key role in today's home and professional environments. A mechanism for connecting wireless devices to a local area network (LAN) is called Wi-Fi, which is a brand name of the Wi-Fi Alliance for devices using the IEEE 802.11 family of standards for wireless data transmission. The IEEE 802.11 standards define two types of wireless nodes, a general wireless device that can connect to other devices called a station (denoted as STA) and a special type of a STA that is in control of the network, namely an access point (denoted AP). A Wi-Fi network, often called a WLAN (wireless local area network), consists of an AP with one or several STA connected to the AP.

Due to its flexible and "invisible" nature, a lot of LAN applications are utilizing Wi-Fi rather than the classical wired Ethernet approach. This widespread usage of wireless LAN has exposed however a serious downside of using a shared medium technology: interference. Interference, both Wi-Fi and non-Wi-Fi related, leads to a degraded user experience due to the nature of 802.11. In its most common form, IEEE 802.11 networks apply a medium access method in which collisions are avoided by sensing that the medium is used (denoted as CSMA-CA). The medium access method is also commonly known as "listen before talk", describing the essence of the method. Interference from any nature can hence block the medium and force all nodes to remain silent.

Therefore, in certain circumstances, the Wi-Fi connection can suffer from poor performance and even connection loss. Some of these circumstances are obvious and easy to explain to an end user. For example, if the distance between the station and the access point is too large, then signal levels are low and performance will degrade. Other circumstances are "invisible" and not understood by the end-user, e.g. a hidden node. A hidden node is invisible to some of the nodes of a network, leading to a practical failure of the CSMA-CA method which can cause packet collision/corruption over air. In many cases, the end-user is not able to diagnose the problem source and correct the issue.

In-home Wi-Fi network connectivity is correspondingly one of the main Internet service provider support costs and causes for help-desk calls. Today's focus for operators is mainly on Wi-Fi network install, associating a station with an access point. Internet service providers are therefore searching for ways to get a better understanding of the end-user's wireless environment including link quality and performance. Related to Wi-Fi performance, operators can use a remote management protocol such as Broadband Forum (noted BBF) TR-069 protocol, which provides access to Wi-Fi parameters as defined in the Internet Gateway Device data model BBF TR-181. But the information available via TR-069 is very limited and focused on data traffic. In some cases, an end-user is faced with an issue preventing Wi-Fi connection at all, correspondingly rendering TR-069 monitoring useless. Hence, when an end-user calls a help-desk, it can be a lengthy and expensive process to describe the home topology and diagnose the issue at hand.

The ideal way to analyze Wi-Fi issues, e.g. connection setup, interference, throughput, . . . , is by looking into the master node of the wireless LAN, namely the AP. The AP, as defined in IEEE 802.11, controls the network, hence all data and network control must be visible by the AP. The AP today can deliver statistics regarding packet transmission and signal levels, but only if a link between the AP and a STA can be established. The real issue why a link is dropped or why throughput is low, remains hidden to the internals of the AP. Full packet inspection is not possible, hence leaving technology or protocol analyzers in the dark when it comes down to pinpointing the real issues in a wireless LAN. Today, at best an AP can deliver statistics but no view on what is actually happening in the network.

What a person analyzing a Wi-Fi network is really interested in, is the full packet exchange between the AP and its client STAs, including the 802.11 management and control packets. On Ethernet, this method of packet capture exists and is fairly trivial. Ethernet cards can be put in "promiscuous mode": this mode actually allows direct and transparent access to the send/receive queues of the Ethernet hardware to a third party software (e.g. Wireshark) that can then analyze the packet stream. The software does however not visualize the low level Ethernet traffic but only the traffic above the physical layer. For Ethernet, this level of analysis is sufficient as the physical medium itself is stable. Nevertheless, even on Ethernet one needs "more information", if the link speed negotiation or duplex detection fails. On wireless networks, the multitude of such issues is enormously larger, hence the need to specifically look at the lower layer protocol exchanges in order to understand why the reported impact on the data link is present.

U.S. Pat. No. 8,102,866 discloses a centralized system for the monitoring of remote multimedia signals which monitors and assesses the quality of services distributed over an IP packet telecommunications network comprising a plurality of customer premises equipment, one of the items of such equipment being connectable to an access gateway, such as a digital subscriber line access multiplexer, via a line susceptible of receiving multimedia content such as data, voice and video over IP; the said content being returned directly to the access multiplexer via a return line.

U.S. Pat. No. 7,573, 859 discloses a system and method for remote monitoring in a wireless network using a remote probe. An access point links a wireless client to a wireless switch. The remote probe captures wireless packets, appends radio information, and forwards packets to a remote observer for analysis. In an embodiment, the observer may provide a protocol-level debug.

SUMMARY OF THE INVENTION

The method for monitoring a wireless link of a Wi-Fi node of a customer premises equipment device comprises the steps of replicating receive packets as well as transmit packets passing through the transmit/receive buffers by including a time stamp for said replicated packets, and passing the replicated packets to a monitoring unit. All packets are replicated in particular by including an Rx/Tx control of the Wi-Fi software driver of the customer premises equipment device to obtain the exact packet exchange of the Wi-Fi node including the packet timing.

In a preferred embodiment, each packet of the replicated packet stream is encapsulated within the customer premises equipment device into a single IP-frame, before forwarded to the monitoring unit as an IP stream.

The method includes in an aspect of the invention the step of replicating all receive packets as well as all transmit packets passing through the transmit/receive buffers and passing all replicated packets to the monitoring unit. The replicated receive and transmit packets are passed to the monitoring unit advantageously as a parallel packet stream. The replicated packets can be sent in particular via a digital subscriber line connection of the customer premises equipment device to a monitoring unit of a network service provider.

In a further aspect of the invention, the method for monitoring a wireless link of a Wi-Fi node of a customer premises equipment device comprises the steps of replicating the Wi-Fi packets passing through the transmit/receive buffers, and passing the replicated packets to a monitoring unit.

The customer premises equipment device comprises a Wi-Fi node including a Wi-Fi software driver and a physical layer with transmit/receive buffers, a Wi-Fi monitoring application for replicating the packets passing through the transmit/receive buffers, and a monitoring data path for passing the replicated packets via an IP stream to a monitoring unit. The customer premises equipment device is in particular a residential gateway, a router, a switch, a set-top box or any other Wi-Fi customer premises equipment device and is designed for a connection to an IP interface such as a digital subscriber line, or to a service provider delivering broadband services, a local area network (LAN).

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
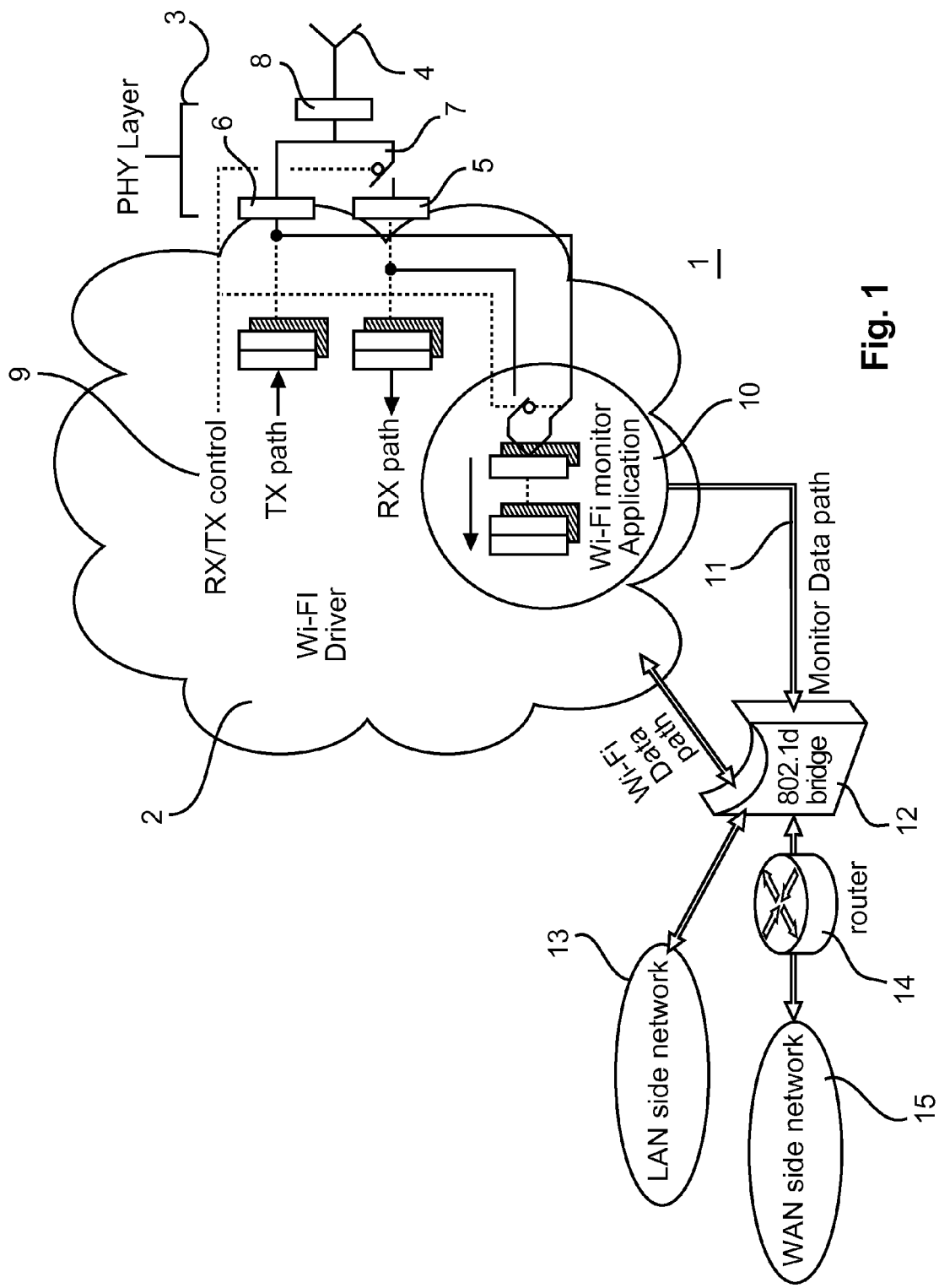
FIG. 1 details of a residential gateway including a Wi-Fi node with a Wi-Fi software driver and a physical layer, and FIG. 2 the residential gateway if FIG. 1 connected via a wired Ethernet connection to a debugging terminal.

In the following description, example methods for monitoring a wireless (Wi-Fi) link of a Wi-Fi node of a customer-premises equipment device are described. For purposes of explanation, various specific details are set forth in order to provide a thorough understanding of preferred embodiments. It will be evident, however, to one skilled in the art that the present invention may be practiced without these specific details.

A customer premises equipment (CPE) device includes for example a controller, e.g. a microprocessor, a non-volatile memory, in which an operating system is stored, a volatile memory for the operation of the CPE device, a Wi-Fi node for a wireless operation and a broadband connection, e.g. an xDSL connection. The Wi-Fi node includes a complex software driver, a physical layer with data buffers and an antenna. A CPE device of this kind is for example a residential gateway, which has a central position within a wireless local area network (WLAN).

The Wi-Fi node is controlled by the software driver which executes a lot of background tasks during operation of the Wi-Fi node, e.g. dynamic rate adaptation, packet aggregation, channel quality monitoring, to name some. On top of signal manipulations, the Wi-Fi driver also embeds the 802.11 protocol stack with the associated IEEE defined management and control messaging. The Wi-Fi driver will hence inject a lot of management and control packets in the data stream, making it impossible to analyze a link by transparently looking at the data frame exchange only.

In order to monitor the physical layer, the layer 0 of the OSI model, the traffic that is transmitted and received by the Wi-Fi node of the residential gateway, the residential gateway includes according to the invention a Wi-Fi monitoring application for delivering all received and transmitted packets to a monitoring unit which then can be accessed from anywhere in the LAN or WAN. The Wi-Fi monitoring application can be understood as a software module within the Wi-Fi driver. The Wi-Fi monitoring application uses the Tx/Rx buffers of the Wi-Fi node to replicate the actual data link in a parallel monitor stream. This stream contains the exact packet exchange and absolute timing within the Wi-Fi network, e.g. by including a time stamp for all replicated receive packets and transmit packets. As the AP embedded in a residential gateway is the center of the Wi-Fi network and generally connected to a WAN and multiple LAN interfaces, the monitor stream can be easily transferred to a remote monitoring unit.

The Wi-Fi monitoring application has access to the following blocks:
Transmit packet queue
Receive packet queue
Transmit/Receive signal indicator The Wi-Fi monitoring application is configured advantageously to encapsulate any Wi-Fi packet into a single IP frame. All packets present on the physical layer queues are encapsulated regardless of their individual function or role in the network. The Wi-Fi packet as a whole is considered as a data payload of the IP frame, and the source/destination address of the IP frame is to be configured by the user requesting the Wi-Fi packet stream. The Wi-Fi packets will be placed in the monitor stream in the exact same order in which they are received or to be transmitted, hence duplicating the packets or frames on the Wi-Fi link exactly with the same inter-packet timing. This method allows therefore to transport the Wi-Fi packet stream towards the monitoring unit with a timing corresponding with the time, when the Wi-Fi packets pass through the transmit/receive buffers. Through the usage of Wireshark and a modified "packet dissector", the content and structure of the Wi-Fi packet stream can be analyzed.

A preferred embodiment of the invention is depicted in FIG. 1, which shows a Wi-Fi software driver 2, a physical layer 3 and an antenna 4 of a residential gateway 1. The physical layer 3 includes data buffers 5, 6 for the receive path and the transmit path, a switch matrix 7 controlled by the Wi-Fi software driver 2 via a Tx/Rx control 9, and a Wi-Fi hardware driver 8. According to the invention, the Wi-Fi software driver 2 includes a Wi-Fi monitoring application 10, which replicates the data traffic passing through the transmit and receive hardware buffers 5, 6 and passes this data stream via a monitoring data path 11 to an external monitoring unit, e.g. a debugging terminal. The monitoring data path 11 is coupled for example to an 802.1d bridge 12, which forwards the data packets e.g. to a LAN side network 13, or via an xDSL router 14 to a wide area side network 15.

Figure 2:
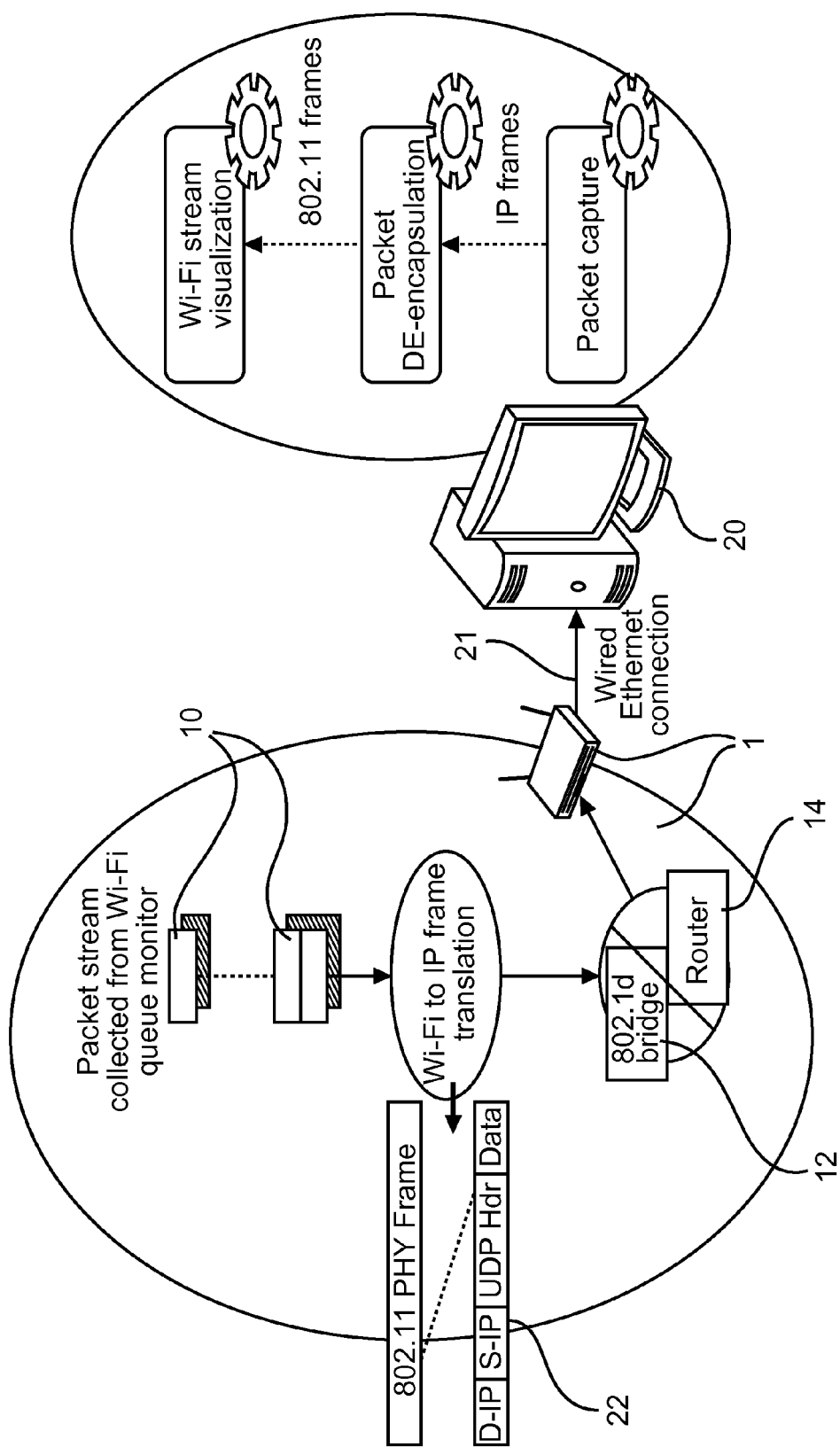

In a preferred embodiment, the residential gateway 1 is connected via a wired Ethernet connection 21 to a debugging terminal 20, as shown in FIG. 2. The Wi-Fi monitoring application 10 delivers a replicated packet stream of the Wi-Fi packet stream passing through the hardware buffers of the physical layer 3, as described with regard to FIG. 1. Each packet of the replicated packet stream is encapsulated within the residential gateway 1 by the Wi-Fi software driver 2 into a single IP-frame 22, which are immediately transmitted via the 802.1d bridge 12 and the router 14 to the debugging terminal 20. Within the debugging terminal 20, the IP frames as provided by the Wi-Fi software driver 2 are captured, and then the IP frames are de-encapsulated, to provide a Wi-Fi packet stream which can be visualized then e.g. by means of Wireshark.

The invention allows therefore in-use debugging of wireless applications. An operator can now analyze exactly what is going on at the residential gateway 1 of an end-user without intrusive action on the network or without having to have physical access to the residential gateway 1 of the end-user. Compared to the classical <<sniffer>> or <<capture>> approaches, this is a tremendous step forward as this method does not leave room for error or uncertainty of interpretation. With the current methods, a <<good view>> or <<best effort estimation>> is all that can be guaranteed as packets are received by the analysis equipment, and there is no strict guarantee that the analysis equipment receives exactly the same packet exchange as the AP or another Wi-Fi node in the network.

The support network of a network service operator can largely benefit from this because changes made to a remote residential gateway via known remote management systems such as TR-069 or SNMP can be directly verified without user feedback. An operator can reconfigure the whole residential gateway 1 even in an automated way, retrieving feedback from the results seen in the monitor stream.

Also, developers do no longer have the need to build messy <<sniffer>> setups or buy expensive RF capturing equipment, because the monitor stream can be captured via the Wi-Fi node under test, e.g. the residential gateway 1, and viewed with known analysis applications. Should security be an issue, encryption can be added in the residential gateway 1 on the monitor stream, but then the monitoring unit needs to apply the corresponding de-encryption.

The analysis is only 100% accurate when the actual link, as seen through one of the nodes of the wireless LAN, is being analyzed. This is a quite crucial item to consider. A sniffer on an external device will "look" at the RF environment differently than the actual AP/STA nodes of the network that is monitored. To some extent, such an analysis is usable, but if specific features or defects of an AP or STA device are creating an issue, e.g. beam forming resulting in a better RF signal, encryption techniques preventing accurate debugging, or physical layer features that have not been integrated in the sniffer hardware or software, . . . , the usage of a sniffer is wasted effort. Analysis must be done "through the eyes and ears" of the network. As the AP is in control of the network, and usually managed by telecom operators that are the prime customers for such an advanced monitoring method, all monitoring methods must be handled by this network node. Debugging or analyzing a wireless LAN through its AP therefore is the key. With the invention, the Wi-Fi link is exactly analyzed at the physical layer level, as it is exactly there where the problems are found.

Also other embodiments of the invention may be utilized by one skilled in the art without departing from the scope of the present invention. The method as described may be used in particular for all kinds of CPE devices using Wi-Fi. The invention resides therefore in the claims herein after appended.

The invention claimed is:

1. A method for monitoring a wireless link of a Wi-Fi node of a customer premises equipment device, the Wi-Fi node including a Wi-Fi software driver and a physical layer with transmit/receive buffers, the method comprising:
monitoring traffic of the physical layer by the Wi-Fi monitoring application and replicating said traffic passing through the transmit/receive buffers, and which corresponds to packets received as well as packets transmitted by said Wi-Fi node, by the Wi-Fi monitoring application by including a time stamp for said replicated received packets as well as said replicated transmitted packets, and
passing the replicated packets to a monitoring unit.

2. The method of claim 1, further comprising replicating the data packets by including the Rx/Tx control of the Wi-Fi software driver to obtain the exact packet exchange of the Wi-Fi node including packet timing.

3. The method of claim 1, further comprising encapsulating each replicated packet within the customer premises equipment device into a single IP-frame, said encapsulating further including placing the replicated packets in the single IP-frame in a same order as the packets were received by, or to be transmitted by, said Wi-Fi node, said encapsulating occurring before said passing so that the single IP-frame is then forwarded to the monitoring unit via said passing.

4. The method of claim 1, further comprising replicating all receive packets as well as all transmit packets passing through the transmit/receive buffers and passing all replicated packets to the monitoring unit.

5. The method of claim 1, further comprising passing the replicated receive and transmit packets to the monitoring unit as a parallel packet stream.

6. The method of claim 1, further comprising passing the replicated packets via a digital subscriber line connection of the customer premises equipment device to a monitoring unit of a network service provider.

7. A customer premises equipment device, comprising a microprocessor, a Wi-Fi node including a Wi-Fi software driver, a physical layer with transmit/receive buffers, and a Wi-Fi monitoring application for replicating the packets passing through the transmit/receive buffers, the Wi-Fi monitoring application being configured to
monitor traffic of the physical layer by the Wi-Fi monitoring application and replicate said traffic passing through the transmit/receive buffers, and which corresponds to packets received as well as packets transmitted by said Wi-Fi node, by the Wi-Fi monitoring application by including a time stamp for said replicated received packets as well as said replicated transmitted packets, and pass the replicated packets to a monitoring unit.

8. The customer premises equipment device of claim 7, comprising a monitoring data path for passing the replicated packets to the monitoring unit.

9. The customer premises equipment device of claim 7, wherein the customer premises equipment device is a residential gateway, router, switch, set-top box or any other Wi-Fi customer premises equipment device.

10. The customer premises equipment device of claim 7, being configured for a connection to a service provider via a digital subscriber line delivering broadband services.

11. The customer premises equipment device of claim 7, wherein the Wi-Fi monitoring application is configured to encapsulate each replicated packet within the customer premises equipment device into a single IP-frame, said encapsulate operation further configured to place the replicated packets in the single IP-frame in a same order as the packets were received by, or to be transmitted by, said Wi-Fi node, said encapsulate occurring before said pass operation so that the single IP-frame is then forwarded to the monitoring unit via said pass operation.

* * * * *